United States Patent [19]

Nishino

[11] Patent Number: 5,010,402

[45] Date of Patent: Apr. 23, 1991

[54] VIDEO SIGNAL COMPRESSION APPARATUS

[75] Inventor: Masakazu Nishino, Kashiwara, Japan

[73] Assignee: Matsushita Electric Industrial Co., Ltd., Osaka, Japan

[21] Appl. No.: 524,741

[22] Filed: May 17, 1990

[51] Int. Cl.$^5$ .............................................. H04N 7/133
[52] U.S. Cl. ..................................... 358/138; 358/133
[58] Field of Search ........................... 358/138, 13, 133

[56] References Cited

U.S. PATENT DOCUMENTS 4,302,775 11/1981 Widergren ............................ 358/13
4,965,667 10/1990 Trew ................................... 358/138

Primary Examiner—Howard W. Brittion
Attorney, Agent, or Firm—Stevens, Davis, Miller & Mosher

[57] ABSTRACT

A video signal compression apparatus in which a video signal having a non-matrix pixel arrangement is separated into a plurality of partial images each having a matrix pixel arrangement. The partial images thus separated are interpolated into those containing low-frequency components and those having high-frequency components. The partial images having low-frequency components are coded by an orthogonal transformation while those having high-frequency components are coded by a non-linear quantization or orthogonal transformation. The amount of data is adaptively assigned from the code length of the partial images having high-frequency components to those having low-frequency components, thus effectively utilizing the orthogonal transormation coding which has a great compression effect on a video signal having a non-matrix pixel arrangement. Further, by virtue of a comparatively small amount of data for the signal of high frequency region, the signal of low frequency region having a comparatively great amount of information can be assigned with a greater amount of data thereby to improve the compression efficiency.

6 Claims, 9 Drawing Sheets

SAMPLING PATTERN OF QUINCUNCIAL (NON-MATRIX) PIXEL ARRANGEMENT

F I G. 5
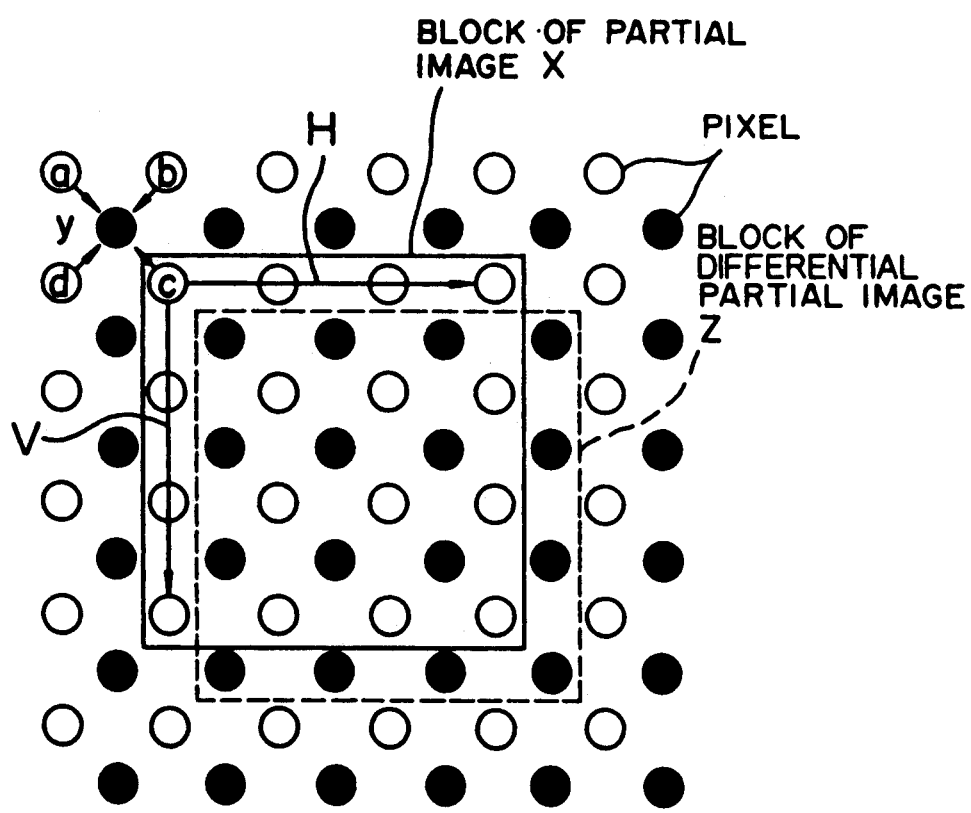
SAMPLING PATTERN OF QUINCUNCIAL (NON-MATRIX)
PIXEL ARRANGEMENT

TRANSMISSIBLE FREQUENCY AREA IN QUINCUNCIAL PIXEL ARRANGEMENT

LOW-FREQUENCY COMPONENT AREA IN MATRIX

HIGH-FREQUENCY ALIAS COMPONENT AREA IN MATRIX

VIDEO SIGNAL COMPRESSION APPARATUS

BACKGROUND OF THE INVENTION

The present invention relates to a method and an apparatus for compressing a video signal.

A method of compressing a video signal is to divide the video signal into blocks and code them by an orthogonal transformation.

A sampling pattern for explaining a conventional method of compressing a video signal is shown in FIG. 1, in which pixels are arranged in matrix. Circles indicate positions of pixels, and dashed lines indicate block boundaries for coding by an orthogonal transformation. In this conventional method, 16 pixels are included in each block. Also, character H1 designates a horizontal conversion coordinate axis for the orthogonal transformation of a video signal, and character V1 a vertical transformation coordinate axis for the same purpose.

In the orthogonal transformation of a video signal divided into blocks as shown above, the coding by the transformation is effected along the coordinate axes H1 and V1 crossing at right angle to each other. Signals coded by the transformation represent two-dimensional frequency information of the coordinate axes H1 and V1. According to this two-dimensional frequency information, the redundant information such as high-frequency or diagonal components of the original video signal are reduced by use of the statistical or visual characteristics of the signal, thereby compressing the amount of information.

The orthogonal transformation includes Hadamard transformation or discrete cosine transformation (DCT).

FIG. 2 is a diagram showing a sampling pattern for explaining a second conventional method of compressing a video signal, in which pixels are arranged in quincunx or non-matrix having an interline offset. Circles indicate positions of pixels.

This pixel arrangement is used for MUSE signal proposed for use with satellite broadcasting of a high-definition television signal. In this pixel arrangement, the frequency band in the diagonal direction is reduced by half that in the horizontal or vertical direction, and is also used for the original video signal in matrix subsampled as a compression means by reduction of diagonal components of a video signal.

In FIG. 2, dashed lines represent block boundaries for coding by an orthogonal transformation. Each block contains 16 pixels in this embodiment. Character h2 designates a horizontal conversion coordinate axis for the orthogonal transformation of a video signal, and character V2 a vertical coordinate axis for the same purpose. The conversion coordinate axis V2 is not linear since the sampling pattern is non-matrix.

FIG. 3 is a sampling pattern diagram for explaining a third conventional method of compressing a video signal, in which pixels are arranged in quincunx having an interline offset like the second conventional method. In FIG. 3, circles indicate pixel positions, and X interpolated pixels obtained from the values of pixels indicated by circles. Dashed lines represent block boundaries for coding by the orthogonal transformation. In this conventional method, each block contains 16 pixels and 16 interpolated pixels. Character H3 designates a horizontal conversion coordinate axis for the orthogonal transformation of the video signal, and character V3 vertical conversion coordinate axis used for the same purpose.

As explained above, when a video signal divided into blocks is subjected to the orthogonal transformation, the coding by the transformation is effected along the conversion coordinate axes H3 and V3. The conversion coordinate axis V3, however, assumes a linear form since the sampling pattern is of not non-matrix but matrix due to the interpolated pixels.

In the second conventional method, the conversion coordinate axis V2 is not linear and therefore the conversion coordinate axes H2 and V2 fail to cross at right angles to each other. The signal coded by the transformation thus contains a frequency component of the conversion coordinate axis H2 along the vertical conversion coordinate axis V2. Specifically, the frequency information along the conversion coordinate axis H2 is added to that along the vertical conversion coordinate axis V2, thereby preventing an efficient compression of a video signal.

The third conventional method, on the other hand, which has a linear conversion coordinate axis V2 and the conversion coordinates H2 and V2 crossing at right angles to each other, uses interpolation pixels X and therefore requires the coding by transformation of a video signal of 32 pixels for a block including 16 interpolation pixels even in an area corresponding to a video signal of 16 pixels. In other words, the object pixels are increased in number, thus leading on an increased scale and a reduced efficiency of compression processong.

SUMMARY OF THE INVENTION

In view of the above-mentioned facts, a first object of the present invention is to provide a method and an apparatus for efficiently compressing a video signal even of pixels thereof arranged in non-matrix.

A second object of the present invention is to provide a video signal compression apparatus in which even a video signal with a non-matrix pixel arrangement is efficiently coded by an orthogonal transformation without increasing the number of object pixels but with each block having a matrix pixel arrangement and an adaptive assignment of data amount.

In order to achieve the above-mentioned objects, there is provided according to one aspect of the present invention a video signal compression apparatus comprising a separation circuit for separating a video signal of non-matrix pixel arrangement into a plurality of partial images each having a matrix pixel arrangement and extracting an optional one of the partial images, an interpolation circuit for interpolating to determine image of pixel portion of other non-extracted partial image from the extracted partial image, a subtractor circuit for determining as a differential image the difference between the partial image not extracted and the image of the interpolated portion, an orthogonal transformation and coding circuit for separating the extracted partial image into blocks and coding them by an orthogonal transformation, a non-linear quantization and coding circuit for separating the differential image into blocks and coding them by a non-linear quantization, a code length estimate circuit for estimating a code length of an output of the non-linear quantization and coding circuit, and a code length assignment circuit for assigning a code length of an output of the orthogonal transformation and coding circuit adaptively by the estimated output of the code length estimate circuit.

BRIEF DESCRIPTION OF THE DRAWINGS

FIG. 5 is a sampling pattern diagram of a video signal fo explaining the operation of a video signal compression apparatus according to the present invention.

DESCRIPTION OF THE PREFERRED EMBODIMENTS

Figure 1:
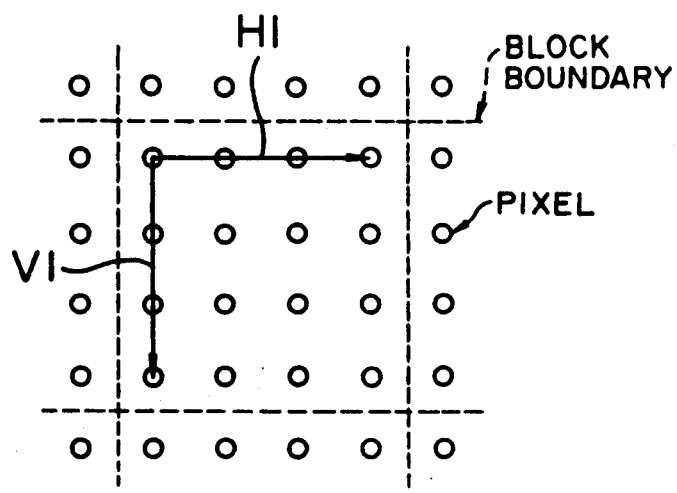
FIGS. 1, 2 an 3 are sampling pattern diagrams of a video signal for explaining a conventional video signal compression apparatus.
Figure 2:
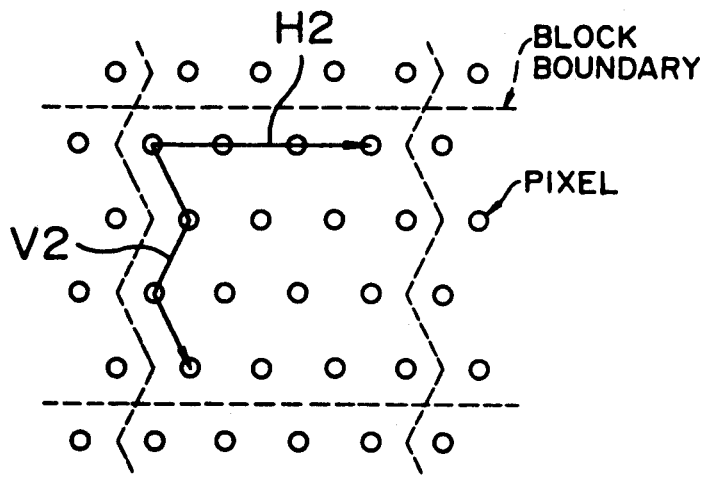
Figure 3:
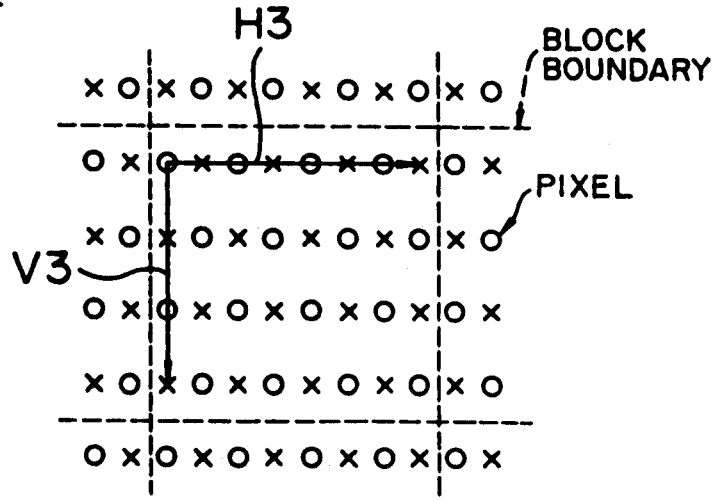
Figure 4:
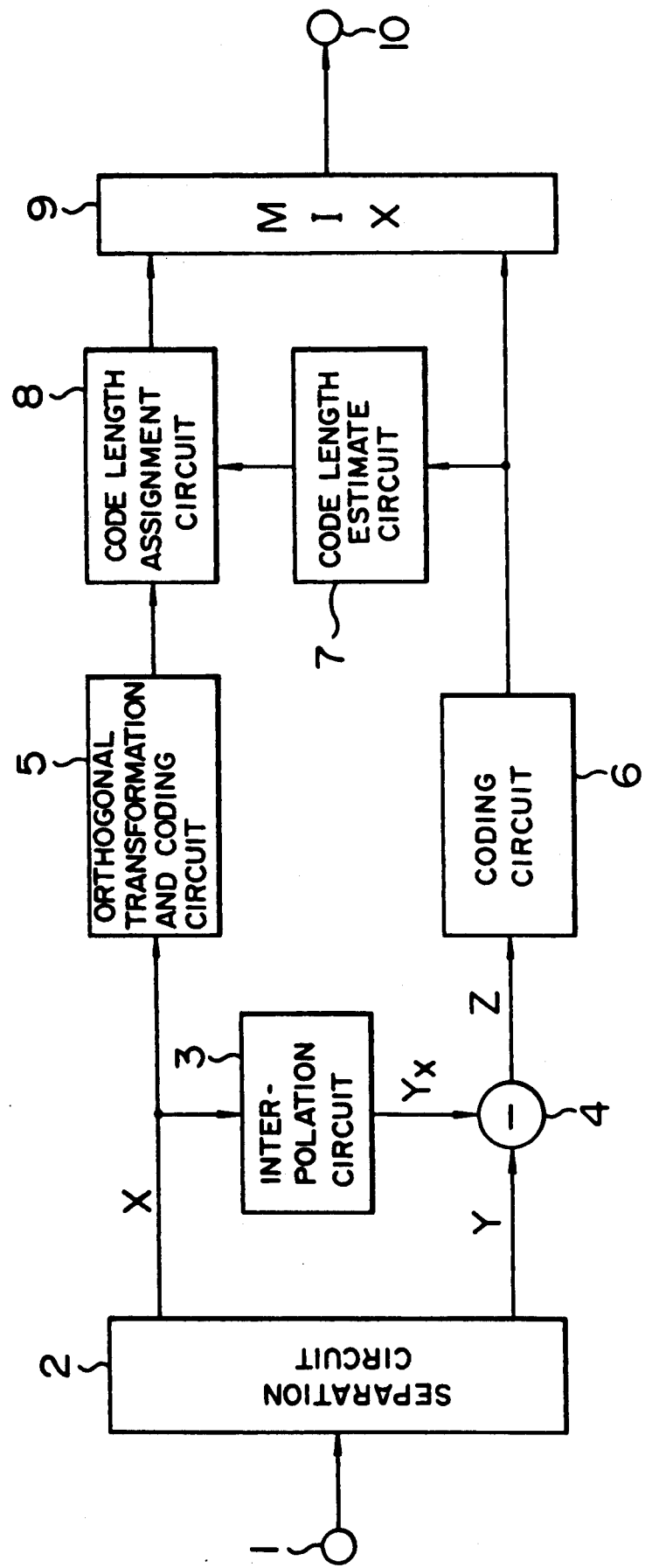
FIG. 4 is a block diagram showing a video signal compression apparatus according to a first embodiment of the present invention.

A block diagram of a video signal compression apparatus according to a first embodiment of the present invention is shown in FIG. 4. In FIG. 4, reference numeral 1 designates an input terminal supplied with a non-matrix video signal as an input signal, numeral 2 a separation circuit for separating the input signal into image signals corresponding to a plurality of partial images each having a matrix pixel arrangement and extracting a given partial image signal X and a given partial image signal Y from such partial image signal, numeral 3 an interpolation circuit for determining from the image signal X an interpolated partial image signal (designated as Yx) associated with the pixel positions of the partial image signal Y, and numeral 4 a subtractor circuit for determining a differential partial image signal Z between the partial image signal Y and the interpolated partial image signal Yx. In the following discussion, the words "partial image signal X, Y, Z, etc." are merely referred to as "partial image X, Y, Z, etc." for the sake of convenience. Numeral 5 designates an orthogonal transformation and coding circuit for coding the partial image X by an orthogonal transformation, numeral 6 a coding circuit for coding the differential partial image Z, numeral 7 a code length estimate circuit for calculating the code length of an output of the coding circuit 6, numeral 8 a code length assignment circuit for assigning the code length of the output of the circuit 5 adaptively on the basis of the code length of the output of the code length estimate circuit 7, and numeral 9 a coupling circuit for coupling the output of the circuit 8 with that of the coding circuit 6 to provide an output signal of the video signal compression apparatus to the output terminal 10.

A sampling pattern diagram for explaining the video signal compression apparatus according to this embodiment is shown in FIG. 5.

The pixels of the input signal applied to the input terminal 1 are arranged in quincuncial nonmatrix arrangement with an interline offset as shown in FIG. 5. White and black circles indicate pixel positions. Each group of the white and black circles of pixels is arranged in matrix. The separation circuit 2 forms a partial image of each pixel group of white and black circles. In this embodiment, the partial image of the white circle pixels is called a partial image X, and that of the black circle pixels a partial image Y.

The interpolation circuit 3 determines a interpolation value for each pixel of the image Y by using pixel values of the partial image X positioned which are around the mentioned each pixel to thereby determine an interpolated partial image Yx. (In FIG. 5, for instance, an average value of pixels a, b, c and d of the partial image X is used as an interpolation value for a pixel y of the partial image Y.) The subtractor circuit 4 determines a differential partial image Z by subtracting the interpolated partial image Yx from the partial image Y.

The orthogonal transformation and coding circuit 5 is for separating the partial image X into blocks each in $n \times n$ matrix having $n \times n$ pixels arranged in n rows and n columns (n: Positive integer) to effect the coding for the orthogonal transformation. The solid frame in FIG. 5 defines a block of the partial image X. The conversion coordinate axes for the block cross each other at right angles in straight lines as shown by H and V. The number n of order of the matrix is 4 which indicates that the number of pixels in the block is 16.

The coding circuit 6 encodes the differential partial image Z by separating it into blocks likewise as in the orthogonal transformation and coding circuit 5. The dashed lined frame in FIG. 5 defines a range of block of the differential partial image Z showing the relative positional relation with that of the partial image X.

The differential partial image Z corresponds to an interpolation error (prediction error) in interpolating for the partial image Y from the partial image X. Its two-dimensional frequency components will be explained below.

Figure 6:
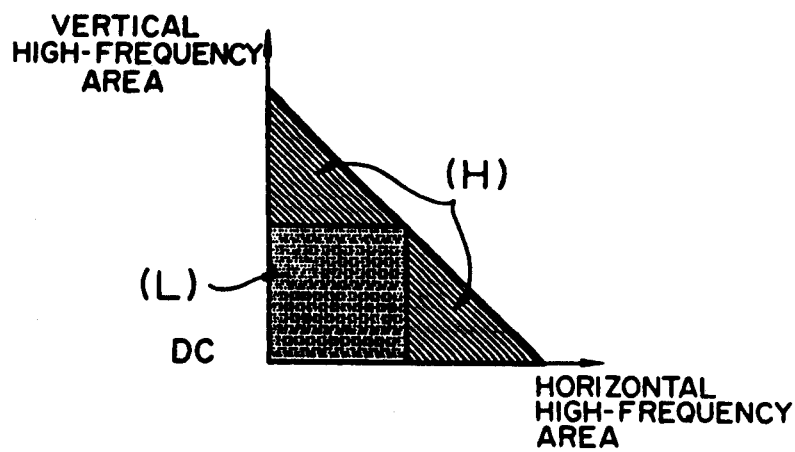
FIG. 6 is a diagram showing a transmissible frequency area of a video signal having a quincuncial pixel arrangement for explaining the operation of a video signal compression apparatus according to the present invention.

FIG. 6 is a diagram two-dimensionally showing a transmissible frequency area of a video signal for the pixel arrangement shown in FIG. 5. In FIG. 6, the whole transmissible area of quincuncial pixel arrangement has a diagonal frequency area reduced by one half of the horizontal or vertical frequency area and is expressed by a triangle. The transmissible area of the pixel arrangement having only the pixels indicated by white circles (partial image X) or black circles (partial image Y) has only a rectangular area corresponding to (L) in FIG. 6. Accordingly, each partial image contains not only the low-frequency component (L) but also the alias component derived from the high-frequency area (H) of FIG. 6 and shown in FIG. 7(H').

Now, the frequency components of the partial image Y and the interpolated partial image Yx will be explained. Both of the partial images have a pixel arrangement shown by the partial image Y in FIG. 5, and therefore the low-frequency component (L) in FIG. 7 and the high-frequency alias component (H') coexist in each of the partial images Y and Yx. The frequency component of the interpolated partial image Yx, however, is obtained by interpolation throuth the interpolation circuit 3 from the partial image X having the low-frequency component (L) and the high-frequency alias component (H') coexisting with each other. The low-frequency component of the image Yx, therefore, has the same phase as that of the partial image Y, but its high-frequency alias component (H') has the opposite phase to that of the latter. The frequency component of the differential partial image Z produced from the subtractor circuit 4 contains only the high-frequency alias component (H') with the low-frequency component (L) of the partial image Y removed.

As seen from above, the differential partial image Z has no low-frequency components having large visual effects, and is composed only of a high-frequency component. Further, each output value of the circuit 4 probably has a very small amplitude in many cases and therefore has only a small amount of information. As a result, the amount of data is sufficiently and efficiently reduced as compared with the case of the partial image X.

The code length estimate circuit 7 is for calculating the code length of the differential partial image Z coded. The code length is sufficiently small as explained above, and therefore, the code length assignment circuit 8 may assign a sufficiently great amount of data to the code word of the partial image X subjected to the orthogonal transformation. And yet, according to the above configuration, the data amount can be assigned adaptively to the partial image x by referring to the code length of the differential partial image Z, it permits an unwasteful compression processing.

Figure 8:
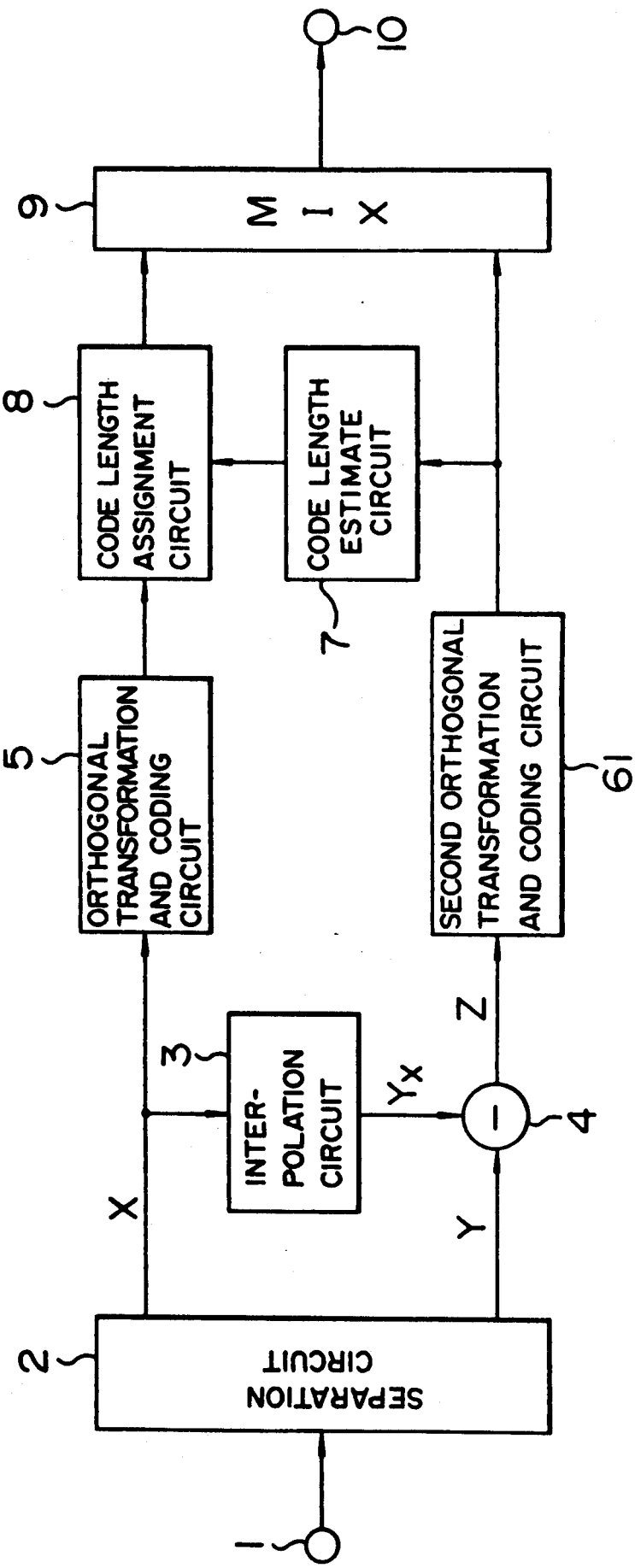
FIG. 8 is a block diagram showing a video signal compression apparatus according to a second embodiment of the present invention.

As explained above, according to the present embodiment, even a video signal having a quincuncial pixel arrangement can be coded by the orthogonal transformation with the matrix pixel arrangement. Further, in view of the fact that the differential partial image Z and the partial image X making up the input to the orthogonal transformation and coding circuit 5 are associated with the same number of pixels as the original video signal, the compression is efficiently made without increasing the pixels involved. Furthermore, the differential partial image Z has no low-frequency components as compared with the partial image X, and therefore can be coded with a short code length, with the result that a correspondingly longer code length may be assigned to the partial image X having a large amount of information, thus making possible an efficient and effective compression processing FIG. 8 is a block diagram showing a video signal compression apparatus according to a second embodiment of the present invention. This embodiment is so configured that the coding circuit 6 in the configuration of the first embodiment of the invention is replaced by a second orthogonal transformation and coding circuit 61. The other component parts are identical to corresponding parts of the first embodiment and will not be described any further.

The present embodiment is for explaining an example of a method of coding in the coding circuit 6 of the first embodiment. As in the orthogonal transformation and coding circuit 5, the second orthogonal transformation and coding circuit 61 also encodes the differential partial images Z by the orthogonal transformation.

In the second orthogonal transformation and coding circuit 61, the differential partial image Z is separated into blocks in n×n matrix in order to encode them by the orthogonal transformation. The range of blocks is as defined by the dashed line in FIG. 5. In the frame of dashed line, the conversion coordinate axes of the block are rectilinear and cross each other at right angles in the same manner as the conversion coordinate axes H and V in the block range (solid frame) of the orthogonal transformation and coding circuit 5 shown in FIG. 5. Also, since the number n of order of matrix is four, there are 16 pixels in the block.

The differential partial image Z making up an input to the second orthogonal transformation and coding circuit 61 has no low-frequency components having large visual effects but is formed of only a high-frequency component. Therefore, the image Z, even after being subjected to the orthogonal transformation coding, has a very short code length as compared with that of the partial image X. As a consequence, in the code length assignment circuit 8, a sufficiently much amount of data is assigned to the code word of the partial image X obtained by the orthogonal transformation coding, thereby permitting an unwasteful compression.

As seen from the foregoing explanation, according to the present embodiment, even a video signal having a quincuncial pixel arrangement may be coded by orthogonal transformation in matrix pixel arrangement. Also, since the differential partial image Z and the partial image X providing an input to the orthogonal transformation and coding circuit 5 are associated with the same number of pixels as the original signal, the compression is possible without increasing the pixels involved. Further, the fact that the differential partial image Z does not contain low-frequency components as compared with the partial image X makes possible an efficient and effective compression.

The orthogonal transformation and coding circuit 5 and the second orthogonal transformation and coding circuit 61 which are provided as separate means in the present embodiment shown in FIG. 8 may be alternatively integrated into a single orthogonal transformation and coding circuit if the matrix blocks of the respective circuit orthogonal transformation have the same order of column or row number.

Figure 9:
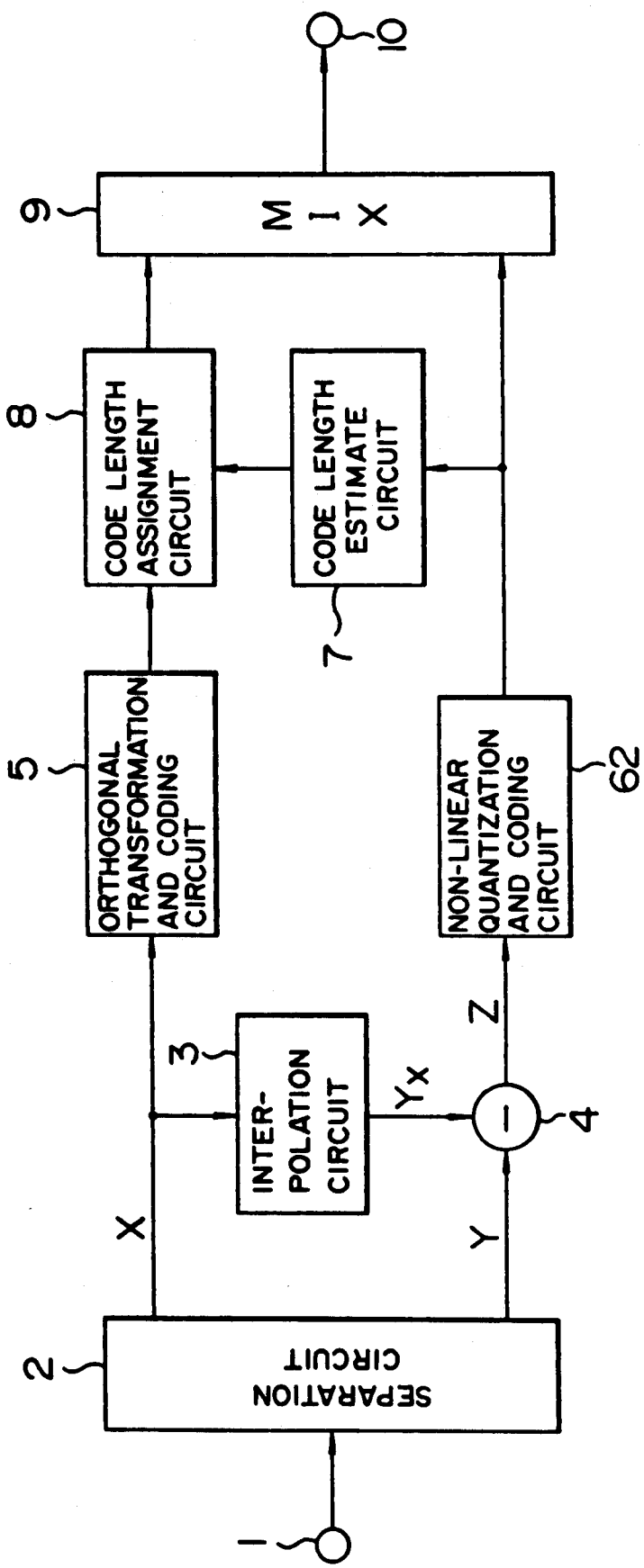
FIG. 9 is a block diagram of a video signal compression apparatus according to a third embodiment of the present invention.

FIG. 9 is a block diagram showing a video signal compression apparatus according to a third embodiment of the present invention. Unlike in the first embodiment shown in FIG. 4, the present embodiment has a non-linear quantization and coding circuit 62 in place of the coding circuit 6 of the first embodiment. The remaining component parts are identical to the corresponding parts of the first embodiment and will not be described again.

By the present embodiment an example of the method of coding effected by the coding circuit 6 in the first embodiment is explained. The differential partial image Z is coded by a non-linear quantization using the non-linear quantization and coding circuit 62.

The non-linear quantization and coding circuit 62, which separates the differential partial image Z into a plurality of blocks likewise with the orthogonal transformation and coding circuit 5, subjects each pixel in a block to a non-linear quantization. The dashed-line frame in FIG. 5 represents a block range of the differential partial image Z and shows the relative positional relation of the partial image X with the block range. The number of order of matrix is four, which means there are 16 pixels in a block.

The differential partial image X making up an input to the non-linear quantization and coding circuit 62 has no low-frequency components causing great visual effects as mentioned above but is configured only of a high-frequency component, and therefore causes little visual effect even after non-linear quantization of a large amplitude value. As a result, the code length assignment circuit 8 may assign a sufficient amount of data to the code word of the partial image X subjected to the orthogonal transformation and coding, thus permitting an unwasteful compression. Further, the non-linear quantization and coding circuit 62 is simple and compact in circuit configuration, and therefore has an advantage of small circuit scale.

As described above, according to the present embodiment, even a video image with quincuncial pixel arrangement can be coded by an orthogonal transformation in matrix pixel arrangement. Also, in view of the fact that the differential partial image Z and the partial image X of the input to the orthogonal transformation and coding circuit 5 have the same number of pixels as the original image signal, an efficient compression is possible without increasing the pixels involved. Furthermore, since the differential partial image Z has a few low-frequency components than the partial image X, efficient and effective compression processing is possible by a non-linear quantization with a simple circuit configuration without orthogonal transformation.

The non-linear quantization characteristic of the non-linear quantization and coding circuit 62 has not been specifically explained in the present embodiment. In view of the fact that the differential partial image Z corresponds to an interpolation error (or prediction error) caused in interpolating for the partial image Y from the partial image X, however, a large amplitude of the differential partial image Z leads to a small visual effect of the quantization error, and therefore the larger the amplitude, the more appropriate the non-linear quantization characteristic for compression.

Figure 10:
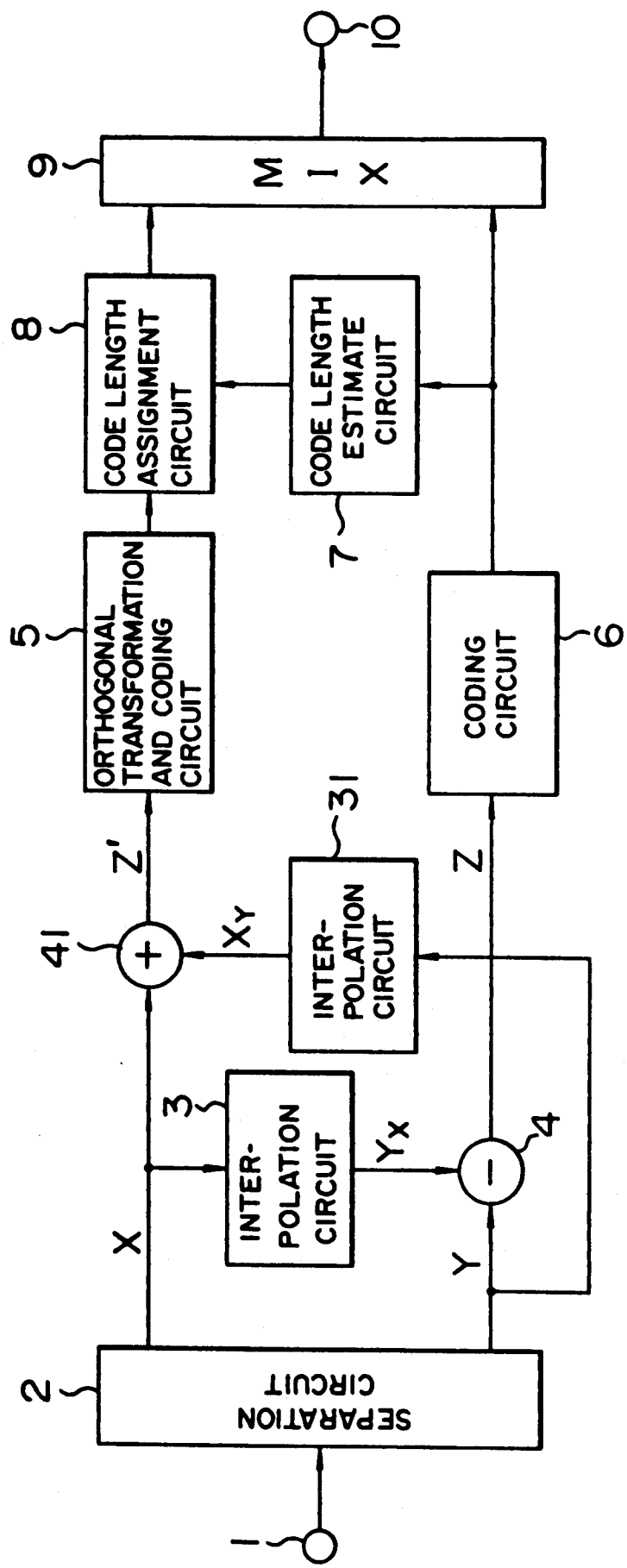
FIG. 10 is a block diagram of a video signal compression apparatus according to a fourth embodiment of the present invention.

FIG. 10 is a block diagram showing a video signal compression apparatus according to a fourth embodiment of the present invention. In FIG. 10, numeral 1 designates an input terminal supplied with a non-matrix video signal as an input signal, numeral 2 a separation circuit for separating the input signal into a plurality of partial images in matrix pixel arrangement and extracting a given partial image X and a given partial image Y from a plurality of partial images, numeral 3 a first interpolation circuit for determining a first interpolated partial image (assumed to be Yx) for pixel positions of the partial image Y from the partial image X, numeral 31 a second interpolation circuit for determining a second interpolated image (assumed to be Xy) for pixel positions of the partial image X from the partial image Y, numeral 4 a subtractor circuit for determining a differential partial image Z between the partial image Y and the first interpolated image Yx, and numeral 41 an adder circuit determining a sum partial image Z' making up a sum of the partial image X and the second interpolated partial image Xy. Numeral 5 designates an orthogonal transformation and coding circuit for subjecting the sum partial image Z' to coding by an orthogonal transformation, numeral 6 a coding circuit for coding the differential partial image Z, numeral 7 a code length estimate circuit for calculating the code length of an output of the coding circuit 6, numeral 8 a code length assignment circuit for assigning the code length of the output of the orthogonal transformation and coding circuit 5 adaptively on the basis of the code length fo the output of the code length estimate circuit 7, and numeral 9 a coupling circuit for coupling an output of the code length assignment circuit 8 with that of the coding circuit 6 and producing the result thereof as an output signal of the video signal compression apparatus at the output terminal 10.

In FIG. 10, the component parts designated by numerals 1 to 10 have functions identical or equivalent to corresponding component parts of the first embodiment of the present invention, and therefore have the same reference numerals respectively. The only difference is that the second interpolation circuit 31 and the adder circuit 41 are newly inserted, and the input to the orthogonal transformation and coding circuit 5 makes up a sum partial image Z' in FIG. 10.

Figure 7A:
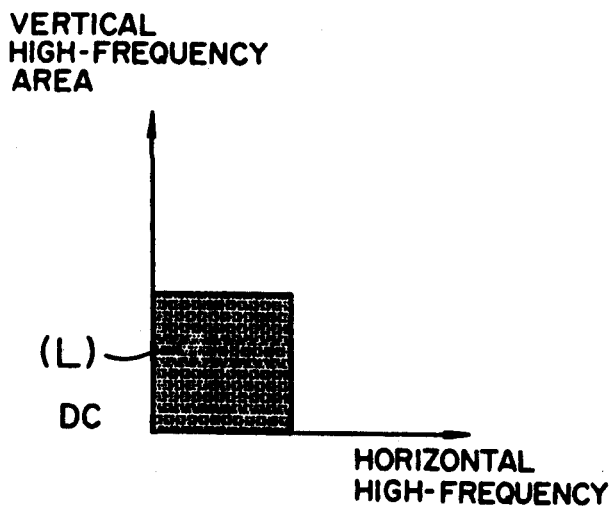
FIGS. 7A and 7B are diagrams showing a transmissible frequency area of a video signal in matrix pixel arrangement extracted from a video signal in quincuncial pixel arrangement for explaining the operation of a video signal compression apparatus according to the present invention.
Figure 7B:
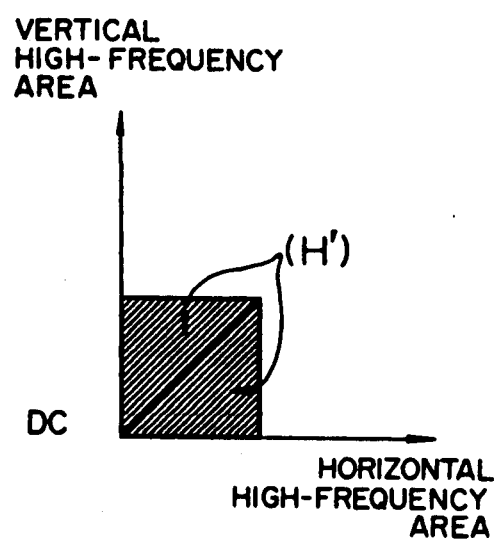

The present embodiment will be explained below with reference to FIGS. 6 and 7 showing transmissible frequency regions.

It has been explained above that the preceding embodiments have a frequency component of the differential partial image Z made up only of a high-frequency alias component (H') in FIG. 7. Now, therefore, the frequency component of the sum partial image Z' will be explained.

The second interpolated image Xy making up an output of the second interpolation circuit 31 is produced for a pixel arrangement (pixels designated as white circles) same as that of the partial image X shown in FIG. 5, and therefore its frequency component contains a low-frequency component (L) and a high-frequency alias component (H'). Since the second interpolated partial image Xy is interpolated by the second interpolation circuit 31, however, its low frequency component (L) is in phase with that of the partial image X, but its high frequency component (H') is in opposite phase with that of the partial image X. As a result, the adder circuit 41 operates to offset the high-frequency alias components (H') of the partial image X and the second interpolated partial image Xy in order to produce the sum partial image Z', thereby leaving only their low-frequency components (L).

For the reason mentioned above, the differential partial image Z and the sum partial image Z' which are extracted by the two interpolation circuits (designated by 3 and 31) and the two arithmetic operation circuits (designated by 4 and 41) ar equivalent to two equal high- and low-frequency portions respectively of the transmissible frequency region of the input signal in the quincuncial pixel arrangement shown in FIG. 6. In addition, the number of pixels involved remains the same as but not more than the pixels of the input signal.

Now, the coding operation performed in the latter stage of the circuit arrangement will be explained.

The coding circuit 6, which is supplied with the differential partial image X made up only of the high-frequency alias component (H'), has no low-frequency components having large visual effects like in the first embodiment, and therefore gives little visual effects by the coding. Further, regarding the output of the circuit 6, the probability of having a very small amplitude is high for each coded value, thus leading to a small amount of information carried thereby. As a consequence, the amount of data for each pixel is sufficiently reduced as compared with the sum partial image Z' made up only of the low-frequency components (L).

On the other hand, the orthogonal transformation and coding circuit 5 is supplied with the sum partial image Z' comprised of only the low-frequency components. As compared with the differential partial image X, the 25 sum partial image Z' has a great amount of information and contains a low-frequency component having a large visual effect. Unlike in the first, second and third embodiments described above, however, the sum partial image Z' having no high-frequency alias components (H') is applied instead of the partial image X to the input of the orthogonal transformation and coding circuit 5, and therefore the amount of information is accordingly reduced for a smaller amount of data for each pixel.

As a result, the code length of the differential partial image Z of the coding estimate circuit 7 is equivalent to that in the first embodiment, and also the code length assigned to the output of the circuit 5 by the code assignment circuit 8 is equivalent to the one in the first embodiment mentioned above. Nevertheless, the output of the circuit 5 is the result of coding of the sum partial image Z' containing no high-frequency alias components. The compression efficiency is thus improved.

As explained above, according to the present embodiment, even a video signal having a quincuncial pixel arrangement is coded by orthogonal transformation in matrix pixel arrangement. Also, the differential partial image Z of the input to the coding circuit 6 and the sum partial image Z' of the input to the circuit 5 are associated with the same number of pixels as the original video image, so that compression is effected efficiently without increasing the number of pixels involved. Further, the sum partial image Z' has not any high-frequency alias components for an improved coding efficiency, and the differential partial image Z is free of low-frequency components. Therefore, the code length is short, and the difference may be assigned to the code length of the sum partial image Z' having a great amount of information, thus making possible an efficient and effective compression.

Figure 11:
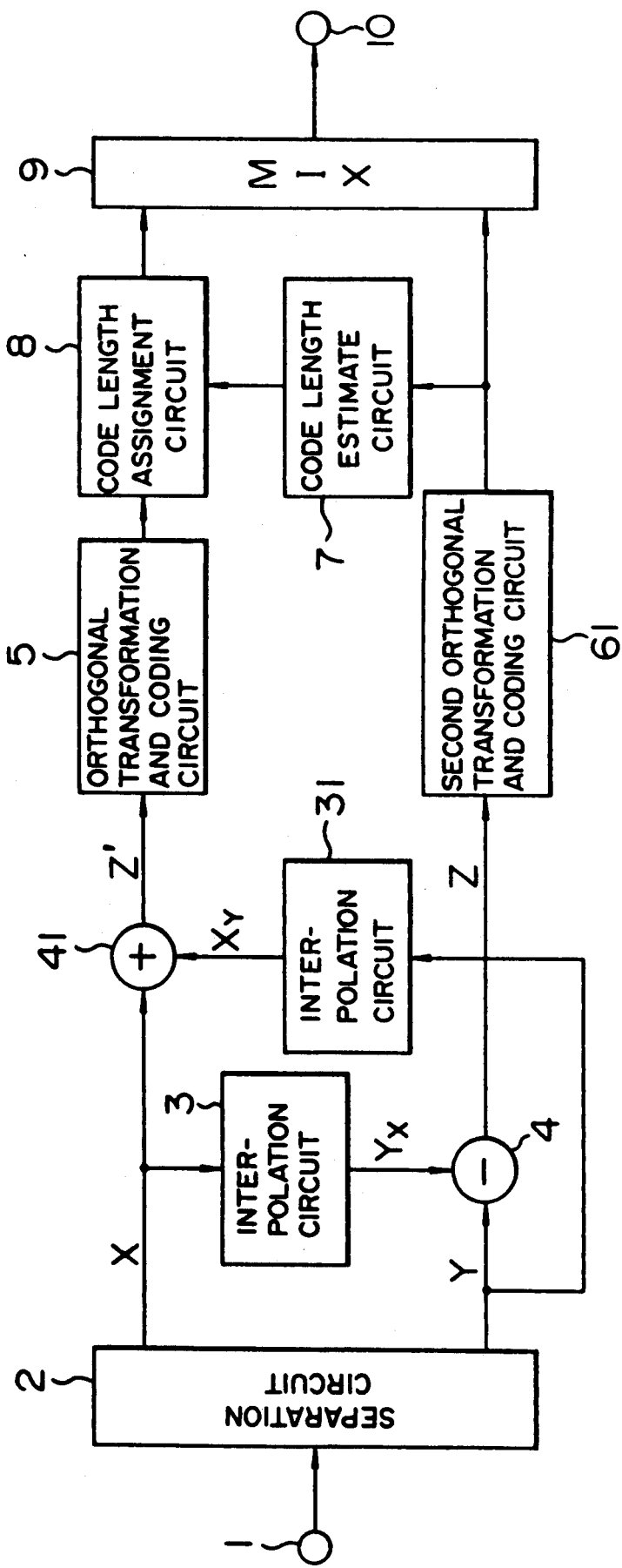
FIG. 11 is a block diagram of a video signal compression apparatus according to a fifth embodiment of the present invention.

FIG. 11 is a block diagram showing a video signal compression apparatus according to a fifth embodiment of the present invention. This embodiment is so configured that the coding circuit 6 in the configuration of the fourth embodiment shown in FIG. 10 is replaced by a second orthogonal transformation and coding circuit 61. The other component parts are equivalent to the corresponding component parts of the fourth embodiment and therefore will not be described in detail.

The present embodiment is for explaining an example of the method of coding in the coding circuit 6 according to the fourth embodiment. As in the orthogonal transformation and coding circuit 5, the differential partial image X is subjected to orthogonal transformation and coding by the second orthogonal transformation and coding circuit 61.

The second orthogonal transformation and coding circuit 61 separates the differential partial image Z into a plurality of blocks in n×n matrix for the purpose of coding by orthogonal transformation. The range of each block is defined by dashed line in FIG. 5. The conversion coordinate axes in the block defined by dashed line are linear and cross each other at right angles in a manner similar to the conversion coordinate axes H and V in the block range (frame of solid line) of the orthogonal transformation and coding circuit 5 in the diagram. Also, the number n of order of the matrix is four, and therefore each block contains 16 pixels.

The differential partial image Z making up an input to the second orthogonal transformation and coding circuit 61 has no low-frequency components having a large visual effect as described above, but is composed only of a high-frequency component. As compared with the partial image X subjected to coding by orthogonal transformation, therefore, the code length involved is very short even after the coding by orthogonal transformation. As a result, the code length assignment circuit 8 assigns a sufficient amount of data to the code word of the sum partial image Z' subjected to coding by orthogonal transformation, thus permitting unwasteful compression.

As seen from above, according to the present embodiment, even a video signal having a quincuncial pixel arrangement may be coded by orthogonal transformation in matrix pixel arrangement. Also, the sum partial image Z' making up an input to the orthogonal transformation and coding circuit 5 and the differential partial image Z making up an input to the second orthogonal transformation and coding circuit 61 have the same number of pixels as the original video signal, so that compression is effected efficiently without increasing the number of pixels involved. Further, the sum partial image Z' is free of high-frequency alias components for a high coding efficiency, and the differential partial image Z lacks low-frequency components. The code length is thus short, and the corresponding saving may be assigned to the code length of the sum partial image Z' having a great amount of information, thus permitting an efficient an effective compression.

Although the present embodiment shown in FIG. 11 is configured of the orthogonal transformation and coding circuit 5 separated from the second orthogonal transformation and coding circuit 61, these two component parts may be integrated into a single orthogonal transformation and coding circuit as far as the block for the orthogonal transformation has the same number of order of matrix.

Figure 12:
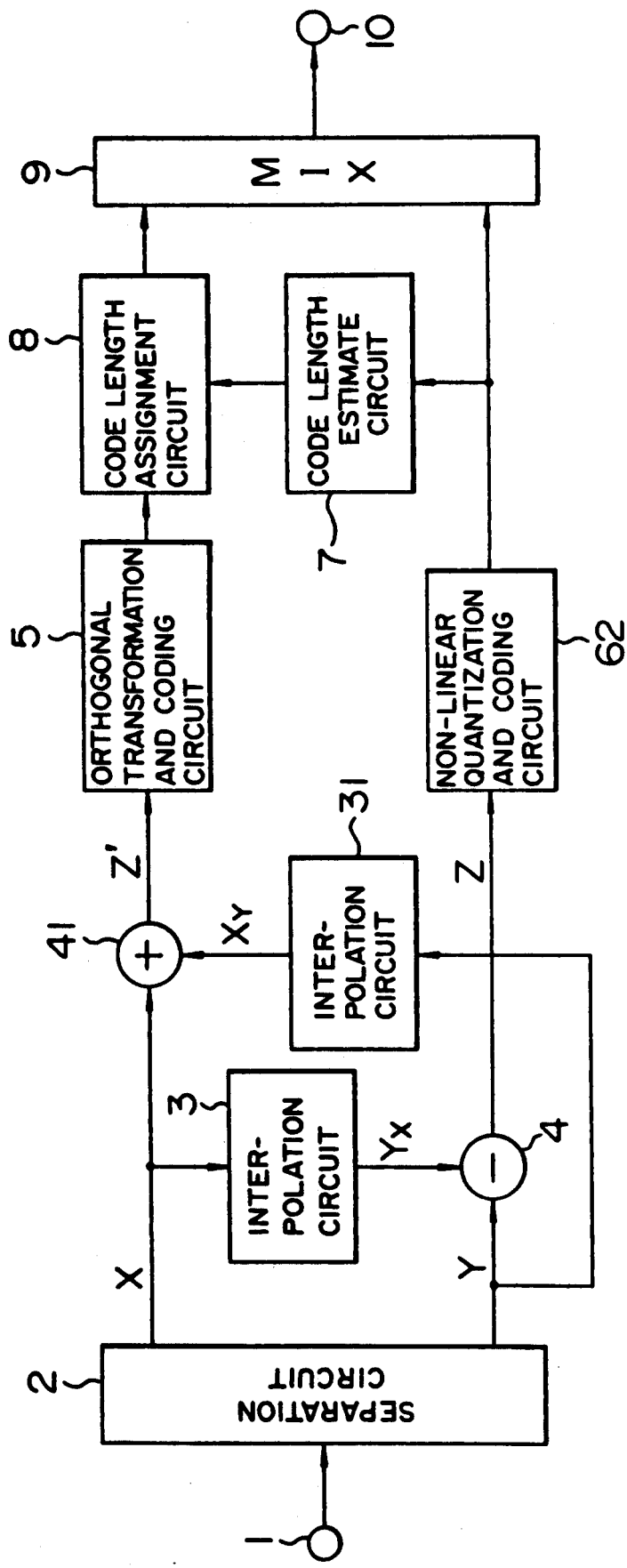
FIG. 12 is a block diagram of a video signal compression apparatus according to a sixth embodiment of the present invention.

A block diagram of a video signal compression apparatus according to a sixth embodiment of the present invention is shown in FIG. 12. This embodiment is so configured that the coding circuit 6 in the fourth embodiment is replaced by a non-linear quantization coding circuit 62. The remaining component parts are identical to corresponding parts in the fourth embodiment and therefore will not be explained again.

According to the present embodiment, which deals with an example of the method of coding in the coding circuit 6 of the fourth embodiment, the differential partial image Z is coded by non-linear quantization by the non-linear quantization coding circuit 62.

The non-linear quantization and coding circuit 62 separates the differential partial image Z into a plurality of blocks like the orthogonal transformation and coding circuit 5, and each pixel in a block is subjected to non-linear quantization. The frame of dashed line in FIG. 5 defines a block range of the differential partial image Z indicating relative positions of the partial image X with the block range. Also, the number of order of matrix is four, which means that there are 16 pixels in a block.

The differential partial image Z providing an input to the non-linear quantization and coding circuit 62 has no low-frequency components having a large visual effect as mentioned above, but has only a high-frequency component, and therefore has only a small visual effect even after non-linear quantization of a value of large amplitude. As a result, the code length assignment circuit 8 may assign a sufficient amount of data to the code word of the partial image X in orthogonal transformation, thereby making possible unwasteful compression processing. Further, the non-linear quantization and coding circuit 62, which is simple in circuit configuration, has the advantage of circuit scale.

As explained above, according to the present embodiment, even a video signal having a quincuncial pixel arrangement may be subjected to coding by orthogonal transformation in matrix pixel arrangement, and also the fact that the differential partial image Z and the partial image X making up an input to the orthogonal transformation and coding circuit 5 have the same number of pixels as the original video signal permits compression processing efficiently without increasing the number of pixels involved. Further, since the differential partial image Z has no low-frequency components as compared with the partial image X, efficient and effective compression is made possible by non-linear quantization with a simple circuit configuration without orthogonal transformation.

It will thus be seen that according to the present embodiment even a video signal having a quincuncial pixel arrangement may be coded by orthogonal transformation in matrix pixel arrangement. Also, the differential partial image Z making up an input to the non-linear quantization and coding circuit 62 and the sum partial image Z' making up an input to the orthogonal transformation and coding circuit 5 have the same number of pixels as the original video image, so that compression is efficiently made without increasing the number of pixels involved. Furthermore, the lack of high-frequency alias components in the sum partial image Z' contributes to an improved coding efficiency, and the differential partial image Z having no low-frequency components makes possible efficient and effective compression processing by non-linear quantization with a simple circuit configuration without any orthogonal transformation.

Although the non-linear quantization characteristic of the non-linear quantization and coding circuit 62 has not been explained in the present embodiment, the differential partial image Z corresponds to an error (or prediction error) of the interpolation of the partial image X against the partial image Y, and therefore the quantization error has only a small visual effect as far as the differential partial image Z has a large amplitude. Therefore, the larger the amplitude, the more appropriate the non-linear quantization characteristic for compression.

Finally, explanation will be made about an expansion processing which is reverse to the compression of a video image.

In the first, second and third embodiments, decoding operations are effected which are of reverse characteristics to the respective coding circuits (including the orthogonal transformation and coding circuit 5, the coding circuit 6, the second orthogonal transformation and coding circuit 61 and the non-linear quantization and coding circuit 62). A decoded signal representative of partial image X is interpolated by a process or circuit equivalent to the interpolation circuit 3 and the resulting interpolated signal is added to decoded signal of partial image Z to produce a decoded signal of partial image Y. Further, such decoded signals of partial images X and Y are coupled to each other in the quincuncial pixel arrangement shown in FIG. 5. Thus the expansion processing is carried out.

According to the fourth, fifth and sixth embodiments, on the other hand, like in the first, second and third embodiments, the decoding operations are effected which are of reverse characteristics to the respective coding circuits (including the orthogonal transformation and coding circuit 5, the coding circuit 6, the second orthogonal transformation and coding circuit 61 and the non-linear quantization and coding circuit 62). A decoded signal of sum partial image Z' having only a low-frequency component is interpolated by a process or circuit equivalent to the interpolation circuit 3 and the resulting interpolated signal is in phase with the low-frequency component of the partial image Y, and therefore the interpolated signal is added to a decoded signal of the differential partial image Z to produce a decoded signal of the partial image Y. On the other hand, a decoded signal of the differential partial image Z having only a high-frequency component is interpolated by a circuit or process equivalent to the interpolation circuit 31 and the resulting interpolated signal is of opposite phase to the high-frequency component of the partial image X, so that the interpolated signal is subtracted from the decoded signal of the sum partial image Z' to produce a decoded signal of the partial image X. Further, the decoded signals of the partial images X and Y are coupled to each other in the quincuncial pixel arrangement as shown in FIG. 5 thereby to complete the expansion processing.

I claim:

1. A video signal compression apparatus comprising:
   a separation circuit for receiving a video signal having a non-matrix pixel arrangement and separating the received signal into a plurality of partial images each having a matrix pixel arrangement;
   an interpolation circuit for producing from a predetermined partial image of the plurality of partial images an interpolated partial image for pixel positions of a remaining partial image of them;
   a subtractor circuit for producing a differential partial image from the difference between the remaining partial image and the interpolated partial image;
   an orthogonal transformation and coding circuit for converting the predetermined partial image into a plurality of blocks and coding them by an orthogonal transformation;
   a coding circuit for converting the differential partial image into plural blocks to code them;
   a code length estimate circuit for determining a code length of a coded output of the coding circuit; and
   a code length assignment circuit for assigning a code length of a coded output of the orthogonal transformation and coding circuit adaptively by a code length output determined by the code length estimate circuit.

2. An apparatus according to claim 1, wherein the coding circuit converts the differential partial image into a plurality of blocks and codes them by an orthogonal transformation.

3. An apparatus according to claim 1, wherein the coding circuit separates the differential partial image into a plurality of blocks and codes them by a non-linear quantization.

4. A video signal compression apparatus comprising:
   a separation circuit for receiving a video signal having a non-matrix pixel arrangement to separate the received signal into a plurality of partial images having a matrix pixel arrangement;
   a first interpolation circuit for producing from a predetermined one of the partial images a first interpolated partial image for pixel positions of a remaining partial image;

a second interpolation circuit for producing from the remaining partial image a second interpolated partial image for pixel positions of the predetermined partial image;

a subtractor circuit for producing a differential partial image from the difference between the remaining partial image and the first interpolated partial image;

an adder circuit for producing a sum partial image by adding the predetermined partial image to the second interpolated partial image;

an orthogonal transformation and coding circuit for converting the sum partial image into a plurality of blocks to code them by an orthogonal transformation;

a coding circuit for converting the differential partial image into a plurality of blocks to code them;

a code length estimate circuit for determining a code length of a coded output of the coding circuit; and a code length assignment circuit for assigning a code length of a coded output of the orthogonal transformation and coding circuit adaptively by the code length determined by the code length estiamte circuit.

5. An apparatus according to claim 4, wherein the coding circuit converts the differential partial image into a plurality of blocks to code them by an orthogonal transformation.

6. An apparatus according to claim 4, wherein the coding circuit converts the differential partial image into a plurality of blocks to code them by a non-linear quantization.

* * * * *